United States Patent
Ahn et al.

(10) Patent No.: US 8,143,516 B2
(45) Date of Patent: Mar. 27, 2012

(54) DYE-SENSITIZED SOLAR CELL MODULE

(75) Inventors: Kwang-Soon Ahn, Suwon-si (KR);
Ji-Won Lee, Suwon-si (KR); Wha-Sup Lee, Suwon-si (KR); Jae-Man Choi, Suwon-si (KR); Byong-Cheol Shin, Suwon-si (KR); Joung-Won Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 746 days.

(21) Appl. No.: 11/111,599

(22) Filed: Apr. 20, 2005

(65) Prior Publication Data
US 2005/0236037 A1 Oct. 27, 2005

(30) Foreign Application Priority Data
Apr. 23, 2004 (KR) .................. 10-2004-0028155

(51) Int. Cl.
*H01L 31/00* (2006.01)
(52) U.S. Cl. ........................................ 136/263; 136/251
(58) Field of Classification Search .................. 136/263, 136/244, 246
See application file for complete search history.

(56) References Cited

U.S. PATENT DOCUMENTS

| | | | | |
|---|---|---|---|---|
| 4,400,577 A | * | 8/1983 | Spear | 136/259 |
| 4,497,974 A | * | 2/1985 | Deckman et al. | 136/259 |
| 5,350,644 A | * | 9/1994 | Graetzel et al. | 429/111 |
| 6,198,091 B1 | * | 3/2001 | Forrest et al. | 250/214.1 |
| 2001/0004901 A1 | * | 6/2001 | Yamanaka et al. | 136/263 |
| 2004/0074531 A1 | * | 4/2004 | Matsui et al. | 136/244 |

FOREIGN PATENT DOCUMENTS

| | | |
|---|---|---|
| CN | 27477094 | 12/2005 |
| JP | 2000-200921 | 7/2000 |
| JP | 2000-315811 | 11/2000 |
| JP | 2000-348783 | 12/2000 |

(Continued)

OTHER PUBLICATIONS

WO/2002/052654 to Matsui, published Apr. 7, 2002, abstract only.*

(Continued)

*Primary Examiner* — Alexa Neckel
*Assistant Examiner* — Miriam Berdichevsky
(74) *Attorney, Agent, or Firm* — Christie, Parker & Hale, LLP (57) ABSTRACT

A high capacity dye-sensitized solar cell module where a plurality of unit cells are simultaneously formed at a substrate in a simplified manner with increased light absorption efficiency. The dye-sensitized solar cell module includes first and second conductive substrates facing one another with regions for a plurality of unit cells. First and second electrodes are formed on the first or the second substrate such that the first and the second electrodes face one another at the respective unit cells. A dye is adsorbed at the first electrode. The space between the first and the second substrates at the respective unit cells is filled with an electrolyte. Insulation regions are formed on at least one of the first and the second substrates between a pair of unit cells neighboring to one another. The pattern of insulation regions, on one or both of the substrates, results in the unit cells being coupled in series, in parallel, or in a combination manner.

15 Claims, 6 Drawing Sheets

FOREIGN PATENT DOCUMENTS

| | | | |
|---|---|---|---|
| JP | 2003-124484 | 4/2003 | |
| JP | 2003-331935 | 11/2003 | |
| KR | 10-2002-0078291 | 10/2002 | |
| KR | 10-0384893 | 10/2002 | |
| WO | WO 00/57441 | * 9/2000 | ............ 136/263 |

OTHER PUBLICATIONS

Korean Patent Abstract, Publication No. 1000384893 B1, Published Oct. 18, 2002, in the name of Kang, et al.
English abstract for CN Publication 27477094 listed above.
KIPO Notice of Allowance dated Oct. 18, 2010, for priority Korean Patent application 10-2004-0028155, noting listed references in this IDS.
Patent Abstracts of Japan and English machine translation for Japanese Publication 2000-315811 listed above.
Patent Abstracts of Japan and English machine translation for Japanese Publication 2000-348783 listed above.
Patent Abstracts of Japan and English machine translation for Japanese Publication 2003-331935 listed above.

* cited by examiner

DYE-SENSITIZED SOLAR CELL MODULE

CROSS REFERENCE TO RELATED APPLICATION

This application claims priority to and the benefit of Korean Patent Application No. 10-2004-0028155 filed on Apr. 23, 2004 in the Korean Intellectual Property Office, the entire content of which is incorporated herein by reference.

BACKGROUND OF THE INVENTION

1. Field of the Invention

The present invention relates to dye-sensitized solar cell modules, and in particular, to a dye-sensitized solar cell module which has a simple structure, and involves simplified processing steps and enhanced capacity.

2. Description of Related Art

Generally, the dye-sensitized solar cell module has a first substrate with a first electrode based on a dye-adsorbed metallic oxide, and a second substrate with a second electrode spaced apart from the first substrate while facing it. An electrolyte is injected between the first and the second substrates.

According to the basic principles of the dye-sensitized solar cells, when sunlight is incident upon the dye-sensitized solar cell, photons are absorbed into the dye and cause the dye to enter an excited state. Subsequently, electrons are transferred from the excited dye to the conduction band of the transition metal oxide of the first electrode. Electrons then flow to the external circuit to give electrical energy thereto, and shift into a lowered energy state where the energy state is lowered by the amount of the energy consumption of the external electrical circuit. Electrons are then transferred to the second electrode.

The dye returns to its initial state once it receives from the electrolyte solution the same number of electrons given to the transition metal oxide. The electrolyte receives electrons from the counter electrode, and transfers them to the dye through oxidation and reduction.

Compared to the conventional silicon solar cell, the dye-sensitized solar cell may be flexibly produced at relatively low production cost in an environment-friendly manner. However, such a dye-sensitized solar cell involves lower photoelectric conversion efficiency, and has limited practical use.

Korean Patent No. 0384893 discloses a method of fabricating a dye-sensitized solar cell module with a plurality of unit cells. The unit cells are separately fabricated, and then, electrically connected to one another using a conductive tape, a conductive double-sided tape, or a insulating double-sided tape.

However, the above method involves complicated steps of processing the unit cells and rearranging them, and increased production cost.

Furthermore, the capacity of the dye-sensitized solar cell is deteriorated due to the conductivity of the conductive tape, and the active area of the module is reduced.

SUMMARY OF THE INVENTION

In accordance with the present invention, a dye-sensitized solar cell module which involves simplified processing steps, and low production cost is provided.

Further in accordance with the present invention, a dye-sensitized solar cell module which involves enlarged active areas, and excellent photoelectric conversion efficiency without deteriorating the cell capacity due to the tape is also provided.

The dye-sensitized solar cell module includes first and second conductive substrates facing one another with regions for a plurality of unit cells. First and second electrodes are formed on the first or the second substrate such that the first and the second electrodes face one another at the respective unit cells. A dye is adsorbed at the first electrode. The space between the first and the second substrates at the respective unit cells is filled with an electrolyte.

Insulation regions may be formed on at least one of the first and the second substrates between a pair of neighboring unit cells.

The insulation regions are formed on one of the first and the second substrates between at least a pair of unit cells, and the pair of unit cells are electrically coupled to one another in a serial manner. The first and the second electrodes may be alternately formed on the first and the second substrates at the pair of unit cells series-coupled to one another. In other words, if the first electrode is formed on the first substrate in one unit cell, the first electrode in the adjacent unit cell will be formed on the second electrode. Then if there are no insulation regions in between the unit cells, for example on the second substrate, the first electrode of one unit cell that is formed on the second substrate is coupled to a second electrode of the adjacent unit cell that is also formed on the second substrate. Connecting the opposing electrodes together creates a series connection between the unit cells connected as such.

Connectors or couplers may be provided to electrically interconnect or couple the unit cells.

The insulation regions may be formed at the first and the second substrates between at least a pair of unit cells, and the pair of unit cells may be electrically coupled to one another in parallel using the connectors. With the pair of unit cells coupled to one another in parallel, the first electrodes are spaced apart from one another on one of the first and the second substrates, and the second electrodes are spaced apart from one another on the other substrate.

The first and the second substrates each have a transparent plastic or glass substrate, and a conductive film formed on the plastic or glass substrate. The insulation regions are formed by spacing the conductive films corresponding to the respective unit cells.

The plastic substrate contains a polymer selected from polyethylene terephthalate (PET), polyethylene naphthalate (PEN), polycarbonate (PC), polypropylene (PP), polyimide (PI), and triacetate cellulose (TAC), and the conductive film contains a compound selected from indium tin oxide (ITO), fluorine tin oxide (FTO), $ZnO$—$Ga_2O_3$, $ZnO$—$Al_2O_3$, and $SnO_2$—$Sb_2O_3$.

The first electrode may contain one or more oxides selected from the group consisting of Ti oxide, Nb oxide, Zn oxide, Sn oxide, Ta oxide, W oxide, Ni oxide, Fe oxide, Cr oxide, V oxide, Pm oxide, Zr oxide, Sr oxide, In oxide, Ir oxide, La oxide, Mo oxide, Mg oxide, Al oxide, Y oxide, Sc oxide, Sm oxide, Ga oxide, In oxide, and SrTi oxide.

The second electrode may be formed with a material selected from Pt, Ru, Pd, Rh, Ir, Os, $WO_3$, $TiO_2$, graphite, and a combination thereof. The second electrode has translucency or transparency.

The electrolyte may be selected from a liquid electrolyte, an ionic liquid electrolyte, a quasi-solid electrolyte, a polymer electrolyte, and a solid electrolyte.

A reflective plate may be externally fitted to one of the first and the second substrates. The reflective plate is formed with a material selected from metal, oxide, nitride, a carbonaceous compound, and a polymer film. The reflectivity of the reflective plate is in the range of 5-100%.

DETAILED DESCRIPTION

Figure 1:
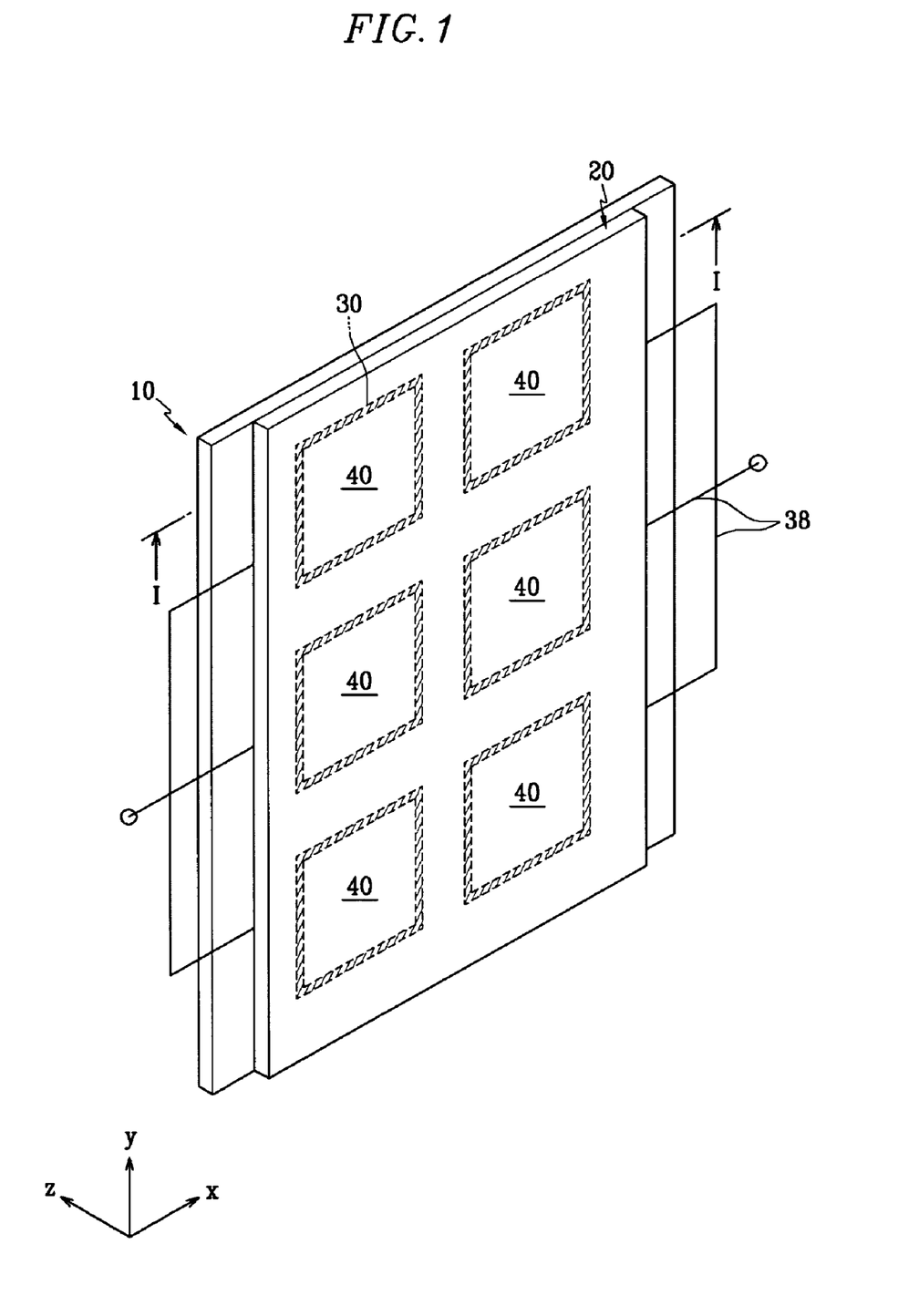
FIG. 1 is a perspective view of a dye-sensitized solar cell module according to a first embodiment of the present invention
Figure 2:
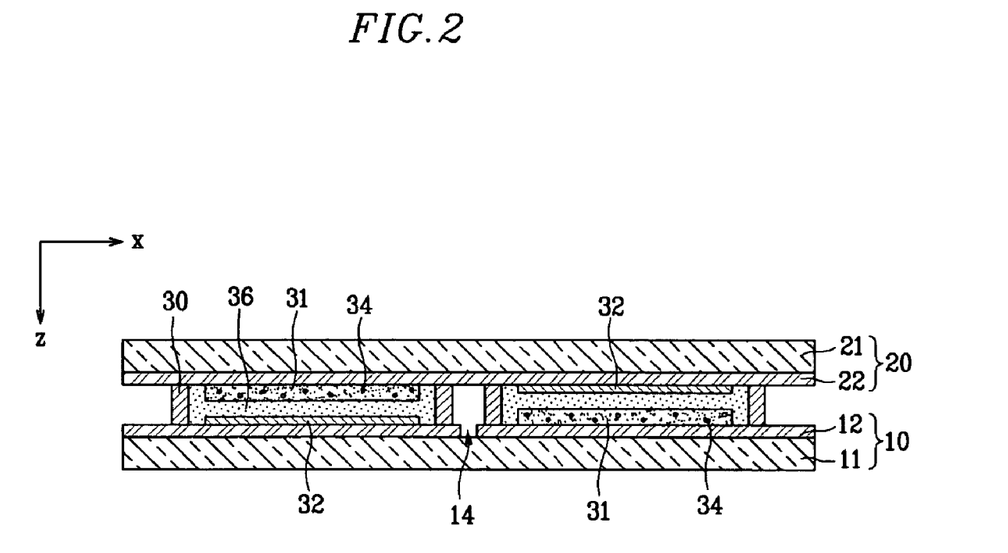
FIG. 2 is a partial cross-sectional view of the dye-sensitized solar cell module of FIG. 1 taken along the I-I line.

Referring now to FIG. 1 and FIG. 2, first and second substrates 10, 20 are spaced apart from one another with a predetermined distance while facing one another, and cell regions are demarcated on the first and second substrates 10, 20 so that a plurality of unit cells 40 may be formed in the demarcated cell regions. The unit cell 40 is capable of functioning as a dye-sensitized solar cell with first and second electrodes 31, 32, a dye 34, and an electrolyte 36.

In this embodiment, a sealant 30 is disposed between the first and the second substrates 10, 20 while surrounding the respective unit cells 40 to seal the first and the second substrates 10, 20 to one another, and demarcate the regions for the respective unit cells 40. The sealant 30 may have various shapes in various embodiments.

The sealant 30 may be formed from different material, such as a thermoplastic polymer film, such as Surlyn™. The thermoplastic polymer film is disposed between the two substrates, and is thermally compressed in a vacuum tight manner. Epoxy resin or ultraviolet (UV) hardener may be used for that purpose.

A unit cell 40 is first explained in further detail, followed by an explanation of the electrical interconnections of a plurality of unit cells 40.

As shown in FIG. 2, the first and the second substrates 10, 20 include plastic or glass substrates 11, 21, and conductive films 12, 22 are formed on the plastic or glass substrates 11, 21, respectively. Accordingly, the first and the second substrates 10, 20 may bear both light transmission and electrical conductivity characteristics.

The first and the second substrates 10, 20 may be formed with plastic material such as polyethylene terephthalate (PET), polyethylene naphthalate (PEN), polycarbonate (PC), polypropylene (PP), polyimide (PI), triacetate cellulose (TAC), or a combination thereof.

The conductive films 12, 22 may be formed with indium tin oxide (ITO), fluorine tin oxide (FTO), ZnO—$Ga_2O_3$, ZnO—$Al_2O_3$, $SnO_2$—$Sb_2O_3$, or a combination thereof.

The first and the second electrodes 31, 32 are formed on the first and the second substrates 10, 20 while facing one another. Either the first electrode 31 may be formed on the first substrate 10 while forming the second electrode 32 on the second substrate 20, or the second electrode 32 may be formed on the first substrate 10 while forming the first electrode 31 on the second substrate 20. This may vary depending upon the electrical interconnection of the unit cells 40. The possible variations will be explained later.

The first electrode 31 may be formed with a metallic oxide based on Ti, Nb, Zn, Sn, Ta, W, Ni, Fe, Cr, V, Pm, Zr, Sr, In, Ir, La, Mo, Mg, Al, Y, Sc, Sm, Ga, In, SrTi, or a composition thereof. The first electrode 31 may be formed with a thickness of 1-40 μm.

The first electrode 31 has nano oxide particles uniformly diffused with a nanometer-leveled particle diameter such that it can bear a porosity as well as a reasonable surface roughness.

The mean particle diameter of the nano particles is in the range of 3-100 nm while it may also be in the range of 10-40 nm. The surface roughness of the first electrode 31 may be 20 nm or more.

$TiO_2$ may be considered as a representative material for the first electrode 31. For particle diameters of 10 nm or less, the adhesion of $TiO_2$ to the substrate deteriorates during the heat treatment after the electrode formation so that $TiO_2$ may separate from the substrate. By contrast, if the particle diameter of $TiO_2$ exceeds 40 nm, the dye adsorption point is lowered due to the reduction of the surface area and separation may be avoided. However, with larger particle diameters the photoelectric conversion efficiency also deteriorates. Accordingly, maintaining the particle diameter of the first electrode 31 in the range of 10-40 nm, may prevent separation of the $TiO_2$ from the substrate while maintaining a high photoelectric conversion efficiency.

Conductive particles based on indium tin oxide may be added to the first electrode 31 to make the electron transfer easy. Furthermore, optical scattering particles may be added to the first electrode 31 to extend the optical path and enhance the efficiency. The optical scattering particles may be formed from the same material as the first electrode 31, and may have a mean particle diameter of 150 nm or more to effectively scatter the light.

Alternatively, a paste of nano metallic oxide particles with a mean particle diameter of 100 nm or less may be coated on the first and the second substrates 10, 20 at predetermined regions. This paste may be heated-treated and dried to form the first electrode 31.

The physical property of the paste is slightly differentiated depending upon the techniques of coating the paste on the first and the second substrates 10, 20. A doctor blade or a screen printing technique is commonly used to coat the paste on the substrate. Alternatively, a spin coating or a spraying technique may be used to enhance the light transmission. In addition, a common wet coating technique including a squeezing technique may be used for that purpose.

When a binder is added to the paste, the paste is heat-treated at 450-600° C. for 30 minutes. With the absence of such a binder, it is possible to heat-treat the paste at 200° C.

In order to maintain the porosity of the first electrode 31, a polymer may be added to the paste, and heat-treated at 400-600° C. In this case, the polymer may be selected from the materials where no organic content, such as polyethylene glycol (PEG), polyethylene oxide (PEO), polyvinyl alcohol (PVA), or polyvinyl pyrrolidone (PVP), is left after the heat treatment. Considering the coating conditions including the relevant coating technique, a polymer with a proper molecular weight is selected, and added to the paste. When the polymer is added to the paste, porosity, diffusion, film formation, and film adhesion are all enhanced.

The second electrode 32 may be formed with a material selected from Pt, Ru, Pd, Rh, Ir, Os, $WO_3$, $TiO_2$, graphite, and a combination thereof. In some embodiments, the second electrode 32 may be formed with a high reflectivity Pt.

The second electrode 32 may have a thickness of 1-300 nm, and a light transmission of 10-100%. That is, the second electrode 32 may be translucent or transparent. As the first and the second electrodes 31, 32 may be formed on the same substrate 10 or 20, the incident light is allowed to pass through the second electrode 32.

The second electrode 32 may be formed using a technique of vacuum deposition, electrochemical deposition, or chemical deposition.

A dye 34 is adsorbed to the surface of the nano particles of the first electrode 31. The dye 34 may contain a material capable of absorbing visible rays, such as a ruthenium (Ru) complex. Ru which belongs to the platinum group, is an element capable of forming various organic metal compounds.

The dye 34 may be formed with $Ru((COOEt)_2bpy)_2(NCS)_2 \cdot 2CH_3CN$ or $Ru((COOH)_2bpy)_2(NCS)_2 \cdot 2CH_3CN$. In addition to $(COOEt)_2$ or $(COOH)_2$, the dye may contain a radical capable of bonding with the surface of the porous electrode that may be, for example, based on $TiO_2$. With the radical-related improvement, the recombination of the electrons and holes is prevented, thereby enhancing the energy conversion efficiency. Furthermore, dyes for improving the absorption of long wavelength visible rays to enhance the energy conversion efficiency, and new dyes capable of easily emitting electrons may be introduced.

Various-colored organic pigments, which are cost effective and abundant, may be used for the dye. Organic pigments, such as coumarine, pheophorbide, or a porphyrin may be used alone or in combination with the Ru complex. The organic pigment improves the absorption of long-wavelength visible rays, and enhances the cell energy conversion efficiency.

The first or the second substrate 10, 20, including the first electrode 31, is dipped in a dye-dissolved alcoholic solution for about 12 hours such that the dye is naturally adsorbed to the nano particles of the first electrode 31.

An electrolyte 36 is formed between the first and the second electrodes 31, 32, corresponding to each unit cell 40. The electrolyte 36 may be a liquid electrolyte, an ionic liquid electrolyte, a quasi-solid electrolyte, a polymer electrolyte, or a solid electrolyte.

Electrolyte 36 is uniformly diffused into the nano particles of the first electrode 31 between the first and the second substrates 10, 20.

Electrolyte 36 includes an iodide-triiodide couple, and has a role of receiving electrons from the counter electrode through oxidation and reduction, and transferring them to the dye 34. The open circuit voltage is determined depending upon the difference between the Fermi energy level of the first electrode 31 and the oxidation and reduction levels of the electrolyte 36.

In the embodiment shown, insulation regions 14, 24, together with connectors 38, are provided to electrically couple the plurality of unit cells 40 to one another in serial, parallel, or mixed manners.

The first insulation regions 14 are formed at the first substrate 10, and second insulation regions 24 are formed at the second substrate 20.

The conductive film portions 12, 22 of the first and the second substrates 10, 20 are partially removed to form the insulation regions 14, 24, thereby intercepting the flow of electrons. The insulation regions 14, 24 may be formed by removing the portions of the conductive films 12, 22 at appropriate regions through wet or dry etching. Selectively, the conductive films 12, 22, outlined with the insulation regions 14, 24, are laminated to form the insulation regions 14, 24 and the conductive films 12, 22.

That is, the conductive film portions 12, 22, corresponding to unit cells 40, may be spaced apart from one another to form the insulation regions 14, 24. As a result, no electrical flow can go through the first and the second substrates 10, 20 at the insulation regions 14, 24. In one embodiment the insulation regions 14, 24 may be formed by partially removing the conductive films 12, 22, but the structure of the insulation regions 14, 24 is not limited thereto.

For example, with a pair of neighboring unit cells 40 in the row direction (in the direction of the x axis of the drawing in FIG. 3), the first insulator 14 is formed at the first substrate 10 between the unit cells 40, but the second insulator 24 is not formed at the second substrate 20 between the unit cells 40. With a pair of unit cells 40, the first and the second electrodes 31, 32 may be alternately formed at the first and the second substrates 10, 20, respectively.

Figure 3:
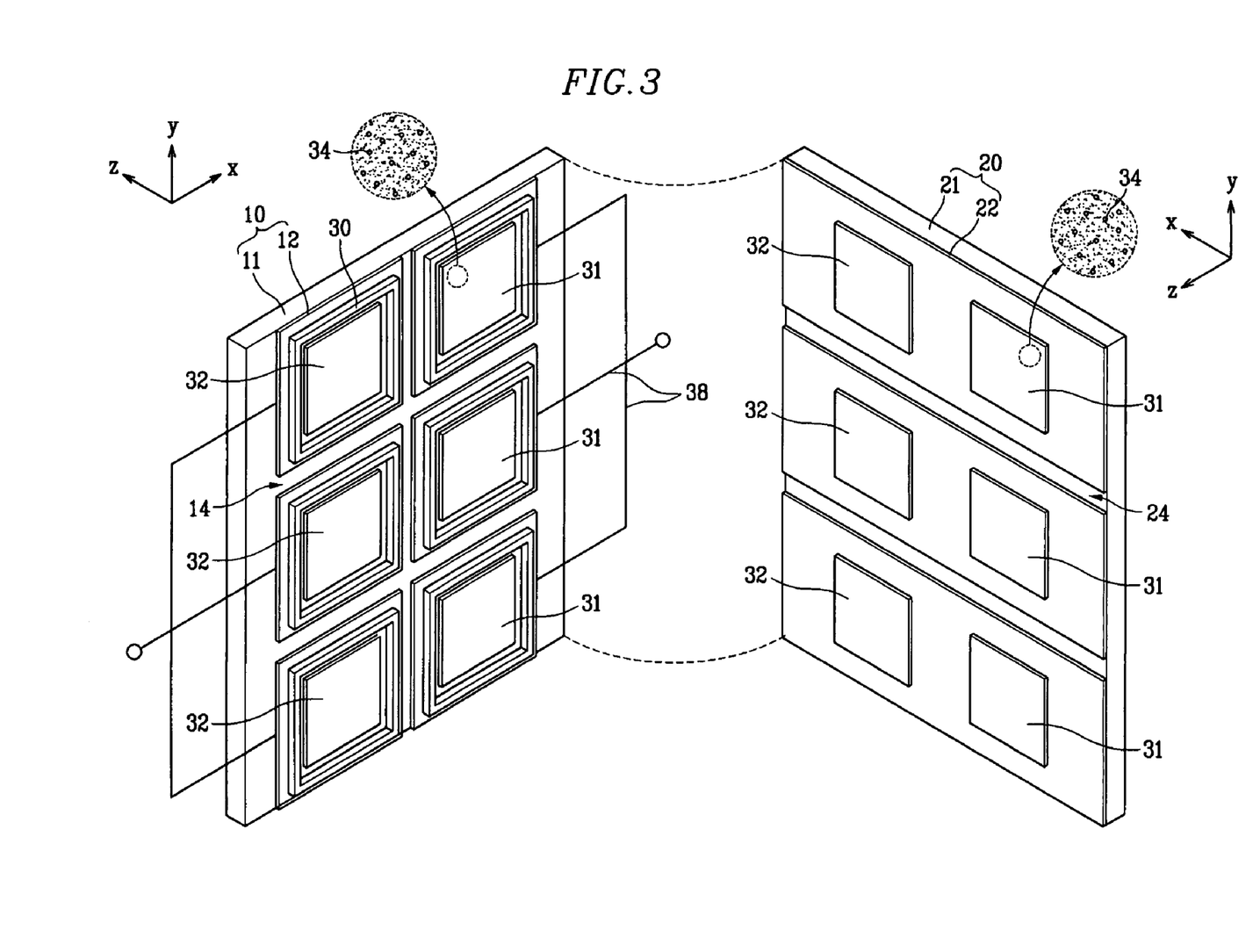
FIG. 3 is a partially exploded perspective view of the dye-sensitized solar cell module shown in FIG. 1, illustrating a disassembled version of the dye-sensitized solar cell module, where first and second substrates are separated from one another, while exposing the junctures of the respective substrates

Accordingly, without the insulator 24, with a pair of unit cells 40, the first electrode 31 and the second electrode 32 are electrically series-coupled to one another by the conductive film portion 22 of the second substrate 20.

With a pair of unit cells 40 neighboring one another in a column direction (in the direction of the y axis of the drawing in FIG. 3), the first and the second insulation regions 14, 24 are formed at the first and the second substrates 10, 20. Accordingly, with the unit cells 40 neighboring one another in the column direction (in the direction of the y axis of the drawing), no electrical flow is made through the first and the second substrates 10, 20. In this case, the unit cells 40 may be electrically coupled to one another in parallel using connectors 38. The connector may be formed with a lead wire.

The first and the second electrodes 31, 32, corresponding to the pair of unit cells 40 are insulated from one another by the first and the second insulation regions 14, 24 while being coupled to one another in parallel by way of the connectors 38.

As shown in FIG. 3, lead wires forming the connectors 38 are fitted to the first substrate 10, and interconnect the plurality of unit cells 40. However, the present invention is not limited to the structure shown and the plurality of unit cells 40 may be interconnected in various other ways.

For example, in the embodiments explained, the insulation regions are formed on only one substrate in the row direction so that the unit cells are series-coupled to one another, or the insulation regions are formed on both substrates in the column direction so that the unit cells are coupled to one another in parallel. However, the present invention is not limited to that structure. The plurality of unit cells 40 may be coupled to one another in parallel or series using only the insulation regions without forming any connector in a separate manner. In addition, the electrical connection may be made in various manners.

As described above, in this embodiment, only the insulation regions 14, 24 and the connectors 38 are provided to electrically interconnect a plurality of unit cells 40 without using a conductive tape, a conductive double-sided tape, or an insulating double-sided tape.

Consequently, the cell capacity is not deteriorated due to the conductivity of the tape, and the loss in the short circuit current is minimized with excellent fill factor. Furthermore, the tape area is eliminated to thereby increase the active area.

Furthermore, with some embodiments of the present invention, a plurality of unit cells 40 are formed on a substrate 10, 20, and insulation regions 14, 24 are formed between the respective unit cells 40 to electrically connect the units cells 40 or insulate them from one another, thereby fabricating a dye-sensitized solar cell module. Accordingly, the steps of processing the dye-sensitized solar cell module are simplified and the production cost can be reduced.

Dye-sensitized solar cell modules according to second and third embodiments of the present invention are explained below.

Figure 4:
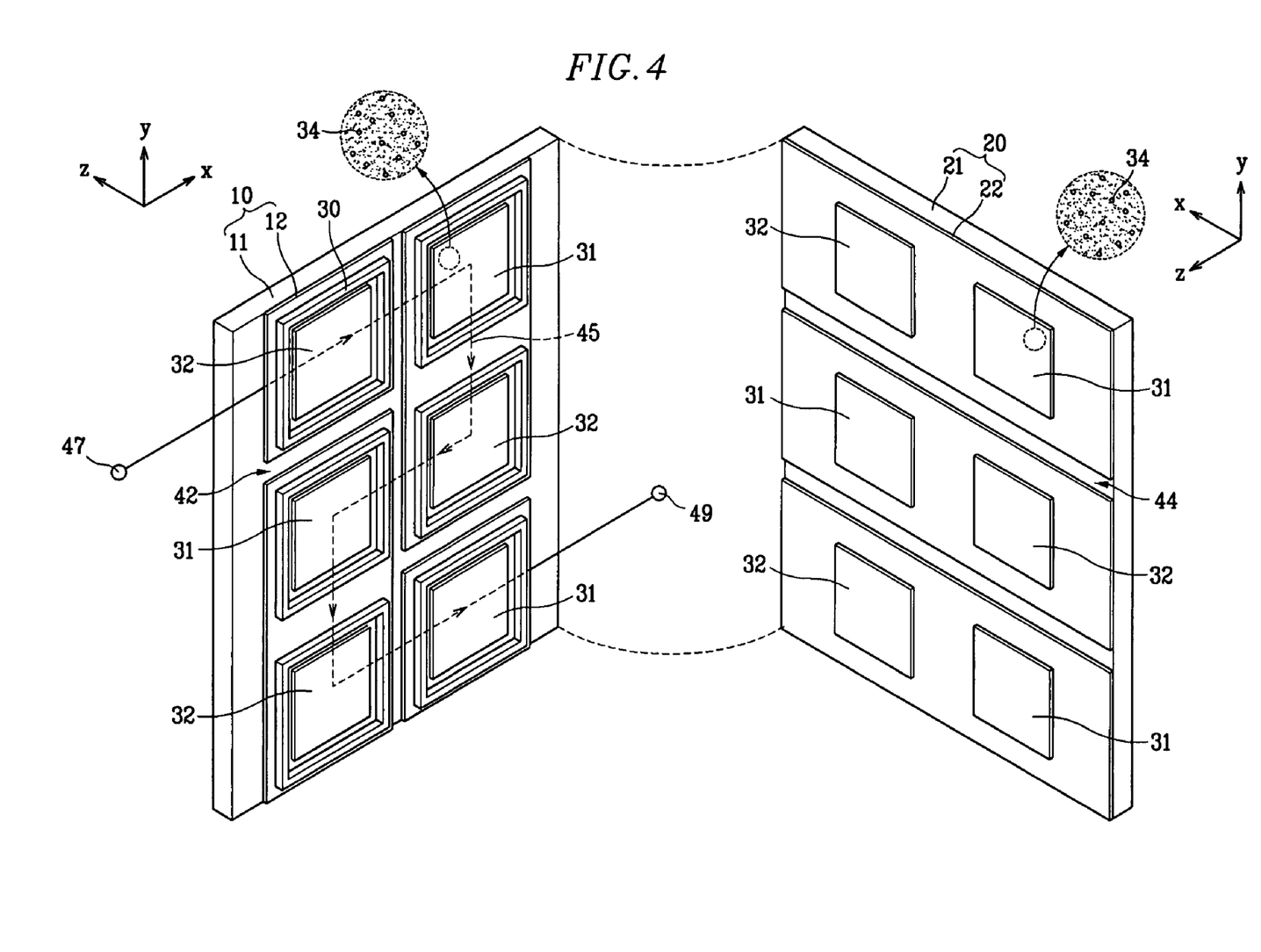
FIG. 4 is a partially exploded perspective view of a dye-sensitized solar cell module according to a second embodiment of the present invention, illustrating the state thereof where the first and the second substrate are separated from one another.

FIG. 4 is a partially exploded perspective view of the dye-sensitized solar cell module according to the second embodiment of the present invention. A plurality of unit cells 40 are series-coupled to one another, as indicated by a dotted arrow 45, using insulation regions 42, 44 formed on the first or the second substrate 10, 20. That is, the insulation regions 42, 44 are formed on only one of the first or the second substrates 10, 20 between the unit cells 40 that are to be series-coupled, and the unit cells 40 are series-coupled to one another through the other substrate. In this embodiment, as parallel connection is not required, separate connectors are not required, and it is only necessary to receive the voltage at the two ends 47, 49 of the series-coupled unit cells 40.

Figure 5:
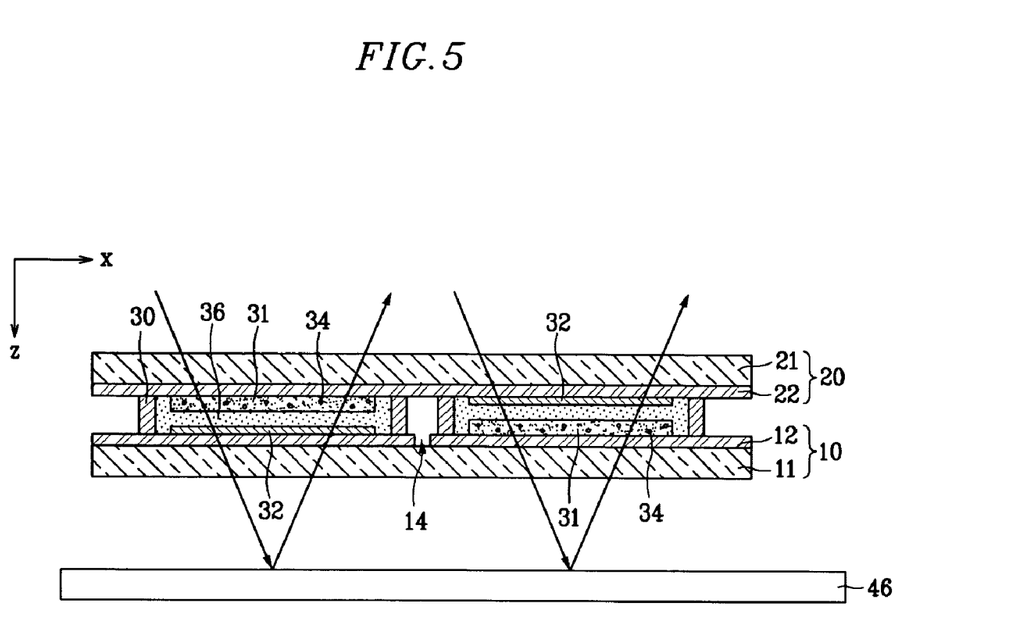
FIG. 5 is a partial cross-sectional view of a dye-sensitized solar cell module according to a third embodiment of the present invention.

FIG. 5 is a partial cross-sectional view of the dye-sensitized solar cell module according to a third embodiment of the present invention.

In this embodiment, a separate reflective plate 46 is externally mounted to the first or the second substrate 10, 20. In one exemplary embodiment, the reflection plate 46 is placed opposite the entrance side of sunlight.

The reflective plate 46 may be formed with a metallic material, an oxide, a nitride, a carbonaceous compound or a polymer film, and the reflectivity thereof may be established to be in the range of 5-100%.

As shown in FIG. 5, in case the reflective plate 46 is installed external to the first substrate 10, the sunlight, incident upon the second substrate 20 and passing through the first substrate 10, is reflected by the reflective plate 46, and reenters the second substrate 20. Accordingly, as compared to the case where the reflective plate 46 is absent, a larger amount of sunlight can be absorbed, thereby enhancing the energy conversion efficiency.

An exemplary dye-sensitized solar cell module according to the present invention was made which is referred to as the Inventive Example module. Another dye-sensitized solar cell module was also made by separately fabricating unit cells and interconnecting them using a conductive tape which is referred to as the Comparative Example module. The current-voltage characteristics of both modules, i.e., the Inventive Example module and the Comparative Example module, were analyzed using a xenon lamp of 100 mW/cm$^2$ as a light source.

Figure 6:
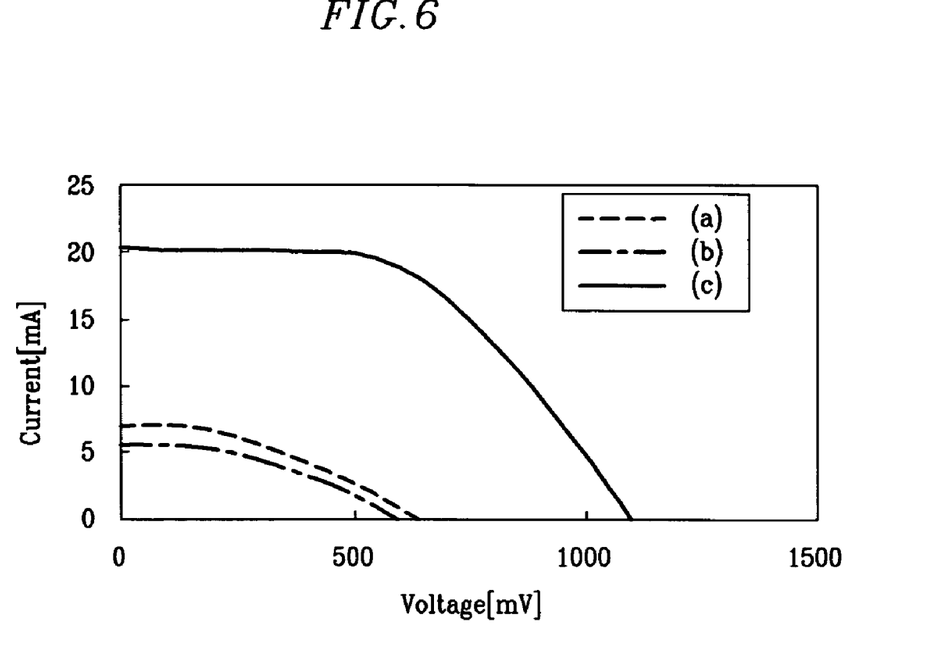
FIG. 6 is a graph of the current-voltage characteristics of a dye-sensitized solar cell module, and its unit cells, according to Example 1.
Figure 7:
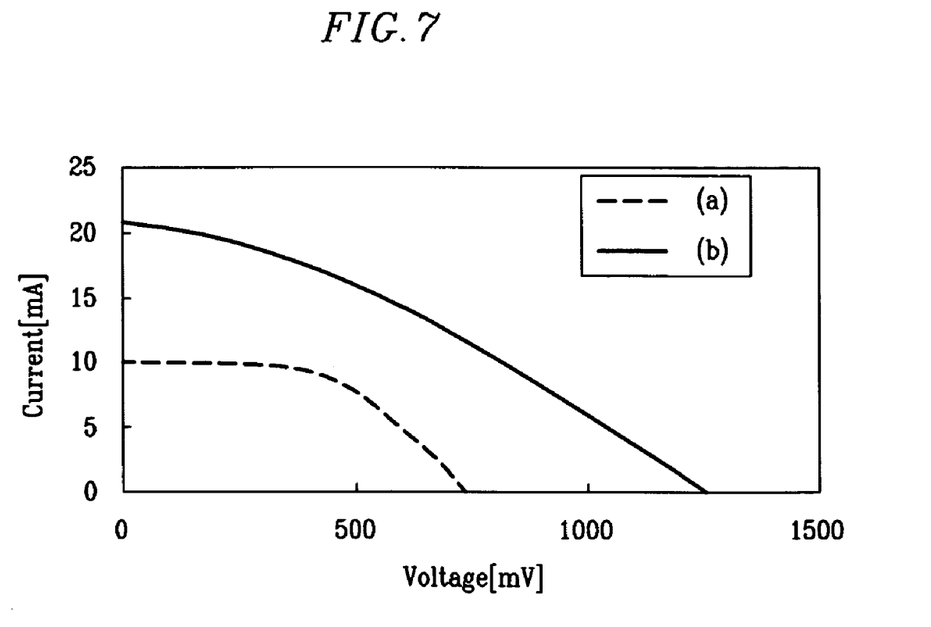
FIG. 7 is a graph of the current-voltage characteristics of a dye-sensitized solar cell module, and its unit cells, according to Comparative Example.

FIG. 6 is a graph of the current-voltage characteristics of the Inventive Example module and its unit cells. FIG. 7 is a graph illustrating the current-voltage characteristics of the Comparative Example module and its unit cells.

In FIG. 6, line (a) illustrates the current-voltage characteristics of the unit cells where the light is incident from the side of the first electrode, or the electron emitting electrode, and line (b) illustrates the current-voltage characteristics of the unit cells where the light is incident from the side of the second electrode. Line (c) illustrates the current-voltage characteristics of the Inventive Example module that is formed from these unit cells.

As line (a) of FIG. 6 shows, the unit cell where the light is incident from the side of the first electrode had a short circuit current of 7.42 mA, an open circuit voltage of 0.67V and a fill factor of 0.37. As line (b) of the same figure shows, the unit cell where the light is incident from the side of the second electrode had a short circuit current of 5.4 mA, an open circuit voltage of 0.65V, and a fill factor of 0.43. As line (c) shows, the Inventive Example module had a short circuit current of 20.5 mA, an open circuit voltage of 1.1V, and a fill factor of 0.52.

In FIG. 7, line (a) illustrates the current-voltage characteristics of the unit cells, and line (b) illustrates the current-voltage characteristics of the Comparative Example module that is formed from these unit cells.

As line (a) of FIG. 7 shows, the unit cells of the Comparative Example had a short circuit current of 9.8 mA, an open circuit voltage of 0.72V and a fill factor of 0.53. As line (b) of the same figure shows, the Comparative Example module had a short circuit current of 21 mA, an open circuit voltage of 1.25V, and a fill factor of 0.33.

A comparison of FIG. 6 and FIG. 7 reveals that the dye-sensitized solar cell module of the Inventive Example was fabricated using unit cells that had significantly smaller short circuit current, open circuit voltage, and fill factor when compared to the unit cells of the Comparative Example module. Nonetheless, the overall values of the short circuit current and the open circuit voltage of two modules, the Inventive Example module and the Comparative Example module, were similar. Furthermore, the fill factor of the Inventive Example module was greater than that of the Comparative Example module. In short, an exemplary dye-sensitized solar cell module fabricated according to the present invention has the advantages of decreased loss in the short circuit current and a superior fill factor.

Only exemplary embodiments including two columns and three rows of unit cells are shown in the figures depicting the dye-sensitized solar cell module. However, the present invention is not limited to the embodiments shown and embodiments of the inventive structure may include cases with a plurality of unit cells.

Although exemplary embodiments of the present invention have been described in detail hereinabove, it should be clearly understood that many variations and/or modifications of the basic inventive concept herein taught which may appear to those skilled in the art will still fall within the spirit and scope of the present invention, as defined in the appended claims.

What is claimed is:

1. A dye-sensitized solar cell module comprising:
   a first substrate and a second substrate facing one another;
   a plurality of unit cells between the first substrate and the second substrate, each unit cell of the plurality of unit cells comprising:
      a first electrode on one of the first substrate or the second substrate, and a second electrode on the other one of the first substrate or the second substrate such that the first electrode and the second electrode face one another;
      a dye at the first electrode;
      an electrolyte filling a space between the first substrate and the second substrate; and
      a sealant around a perimeter of the unit cell for sealing the electrolyte, the first electrode and the second electrode within the unit cell; and
   a plurality of conductive films on the first substrate and the second substrate, and spaced apart from each other to form insulation regions in spaces between the sealants of the plurality of unit cells,
   wherein the first electrode of one of the unit cells and the second electrode of another one of the unit cells are on one of the plurality of conductive films such that the one of the conductive films electrically couples the first electrode of the one of the unit cells to the second electrode of the another one of the unit cells, and wherein a conductive film of the plurality of conductive films on the first substrate couples and completely overlaps two adjacent ones of the unit cells in a first direction and another conductive film of the plurality of conductive films on the second substrate couples and completely overlaps two adjacent ones of the unit cells in a second direction that is different from the first direction.

2. The dye-sensitized solar cell module of claim 1, wherein the insulation regions are on at least one of the first substrate or the second substrate, and an adjacent pair of the plurality of unit cells are electrically coupled to one another in a serial manner, thereby forming series-coupled unit cells.

3. The dye-sensitized solar cell module of claim 2, wherein the first electrodes and the second electrodes of the adjacent pair of the plurality of unit cells are alternately on the first substrate and the second substrate at the series-coupled unit cells.

4. The dye-sensitized solar cell module of claim 1, further comprising connectors for electrically interconnecting the plurality of unit cells.

5. The dye-sensitized solar cell module of claim 4, wherein the insulation regions are at the first substrate and the second substrate, and an adjacent pair of the plurality of unit cells are electrically coupled to one another in parallel by the connectors for forming parallel-coupled unit cells.

6. The dye-sensitized solar cell module of claim 5, wherein for the parallel-coupled unit cells, the first electrodes are spaced apart from one another on one of the first substrate or the second substrate, and the second electrodes are spaced apart from one another on the other one of the first substrate or the second substrate.

7. The dye-sensitized solar cell module of claim 1, wherein the first substrate and the second substrate each comprise a transparent plastic substrate or a glass substrate, and the plurality of conductive films are on the transparent plastic substrate or the glass substrate.

8. The dye-sensitized solar cell module of claim 7, wherein the transparent plastic substrate comprises a polymer selected from the group consisting of polyethylene terephthalate (PET), polyethylene naphthalate (PEN), polycarbonate (PC), polypropylene (PP), polyimide (PI), and triacetate cellulose (TAC), and the plurality of conductive films comprise a compound selected from the group consisting of indium tin oxide (ITO), fluorine tin oxide (FTO), $ZnO$—$Ga_2O_3$, $ZnO$—$Al_2O_3$, and $SnO_2$—$Sb_2O_3$.

9. The dye-sensitized solar cell module of claim 1, wherein the first electrode comprises one or more oxides selected from the group consisting of Ti oxide, Nb oxide, Zn oxide, Sn oxide, Ta oxide, W oxide, Ni oxide, Fe oxide, Cr oxide, V oxide, Pm oxide, Zr oxide, Sr oxide, In oxide, Ir oxide, La oxide, Mo oxide, Mg oxide, Al oxide, Y oxide, Sc oxide, Sm oxide, Ga oxide, In oxide, and SrTi oxide.

10. The dye-sensitized solar cell module of claim 1, wherein the second electrode comprises a material selected from the group consisting of Pt, Ru, Pd, Rh, Ir, Os, $WO_3$, $TiO_2$, graphite, and a combination thereof.

11. The dye-sensitized solar cell module of claim 10, wherein the second electrode has translucency or transparency.

12. The dye-sensitized solar cell module of claim 1, wherein the electrolyte is selected from the group consisting of a liquid electrolyte, an ionic liquid electrolyte, a quasi-solid electrolyte, a polymer electrolyte, and a solid electrolyte.

13. The dye-sensitized solar cell module of claim 1, further comprising a reflective plate on one of the first substrate or the second substrate.

14. The dye-sensitized solar cell module of claim 13, wherein the reflective plate is formed with a material selected from the group consisting of metal, oxide, nitride, a carbonaceous compound, and a polymer film.

15. The dye-sensitized solar cell module of claim 13, wherein the reflectivity of the reflective plate is between 5 and 100%.

* * * * *